(12) United States Patent
Messimer

(10) Patent No.: US 12,484,554 B1
(45) Date of Patent: Dec. 2, 2025

(54) RETRACTABLE DOG LEASH WITH CLIP HANDLE

(71) Applicant: Michael Messimer, Boulder, CO (US)

(72) Inventor: Michael Messimer, Boulder, CO (US)

( * ) Notice: Subject to any disclaimer, the term of this patent is extended or adjusted under 35 U.S.C. 154(b) by 0 days.

(21) Appl. No.: 18/825,550

(22) Filed: Sep. 5, 2024

(51) Int. Cl.
*A01K 27/00* (2006.01)

(52) U.S. Cl.
CPC .................. *A01K 27/004* (2013.01)

(58) Field of Classification Search
CPC ....... A01K 27/006; A01K 1/04; A01K 27/003
USPC ......................................... 119/796, 797, 795
See application file for complete search history.

(56) References Cited

U.S. PATENT DOCUMENTS

| | | | | |
|---|---|---|---|---|
| 2002/0179023 A1* | 12/2002 | Axel | .................. | A01K 27/00 119/801 |
| 2003/0145804 A1* | 8/2003 | Vaccari | .............. | A01K 27/005 119/796 |
| 2008/0042000 A1* | 2/2008 | Horton | .................. | A45F 5/004 119/796 |
| 2008/0105214 A1* | 5/2008 | Moulton | .................. | A01K 1/04 119/796 |
| 2010/0212601 A1* | 8/2010 | Hurwitz | ............... | A01K 27/006 119/796 |
| 2015/0128879 A1* | 5/2015 | Anderson | ............ | A01K 27/004 119/796 |
| 2017/0079245 A1* | 3/2017 | Omelchenko | ........ | A01K 27/004 |
| 2020/0267937 A1* | 8/2020 | Pagan | .................. | B65H 75/406 |
| 2022/0361454 A1* | 11/2022 | Phillips | ................. | F16B 45/023 |

* cited by examiner

*Primary Examiner* — Zoe Tam Tran
(74) *Attorney, Agent, or Firm* — Edwin H. Crabtree

(57) ABSTRACT

A retractable dog leash device featuring a soft grip handle with a spring-loaded clip for easy attachment to fixed objects. The device includes a leash housing for holding a retractable dog leash therein and extending the leash outwardly for attaching to a dog collar. The soft grip handle is attached to the leash housing. The handle is made of a flexible, silicon material for ease in gripping and holding the handle. A lower portion of the handle includes a spring-loaded clip disposed next to the leash housing. When the spring-loaded clip is opened, the handle and the housing can be received around a portion of a chair arm or other object for holding the dog leash and the dog in place.

6 Claims, 5 Drawing Sheets

RETRACTABLE DOG LEASH WITH CLIP HANDLE

(a) FIELD OF THE INVENTION

This invention relates to a retractable dog leash device, and more particularly, but not by way of limitation, to a retractable dog leash device with a leash housing and a soft, flexible grip handle with a spring-loaded clip. The clip can be opened for receiving the handle and the housing around a portion of a chair or similar object and holding the dog leash device thereon.

(b) DISCUSSION OF PRIOR ART

Heretofore, it is a common problem to attach a dog leash to a chair, table, bench, tree and the like by removing the leash from a dog, wrapping the leash around a portion of the chair and then reattaching the leash to the dog. Also, some dog owners add an external rope or a carabiner to the dog leash for attaching to a selected object, which is cumbersome. The subject invention addresses these issues by incorporating a spring-loaded clip into the handle, eliminating the need for additional steps.

SUMMARY OF THE INVENTION

In view of the foregoing, the primary objective of the subject invention to provide a dog leash device with a leash housing and a handle, incorporating a spring-loaded clip for quick attachment to various objects including a chair, table, bench, and like objects without having to detach the leash from the dog.

Another object of the invention is the handle includes the spring-loaded clip in a lower portion of the handle. This feature allows for placing a portion of the leash housing and handle pressed against a side of a chair arm or a chair leg for added strength in holding the dog on a leash.

The subject invention includes a leash housing for holding a retractable dog leash therein and extending the leash outwardly for attaching to a dog collar. A soft grip handle is made of a flexible silicone material for ease in gripping and holding the handle. A lower portion of the handle includes a spring-loaded clip disposed next to the leash housing. When the spring-loaded clip is opened, the handle and the housing can be received around a portion of a chair arm for holding the dog leash is place.

These and other objects of the present invention will become apparent to those familiar with a dog leash when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject retractable dog leash, and in which.

DETAILED DESCRIPTION OF THE PREFERRED EMBODIMENTS

Figure 1:
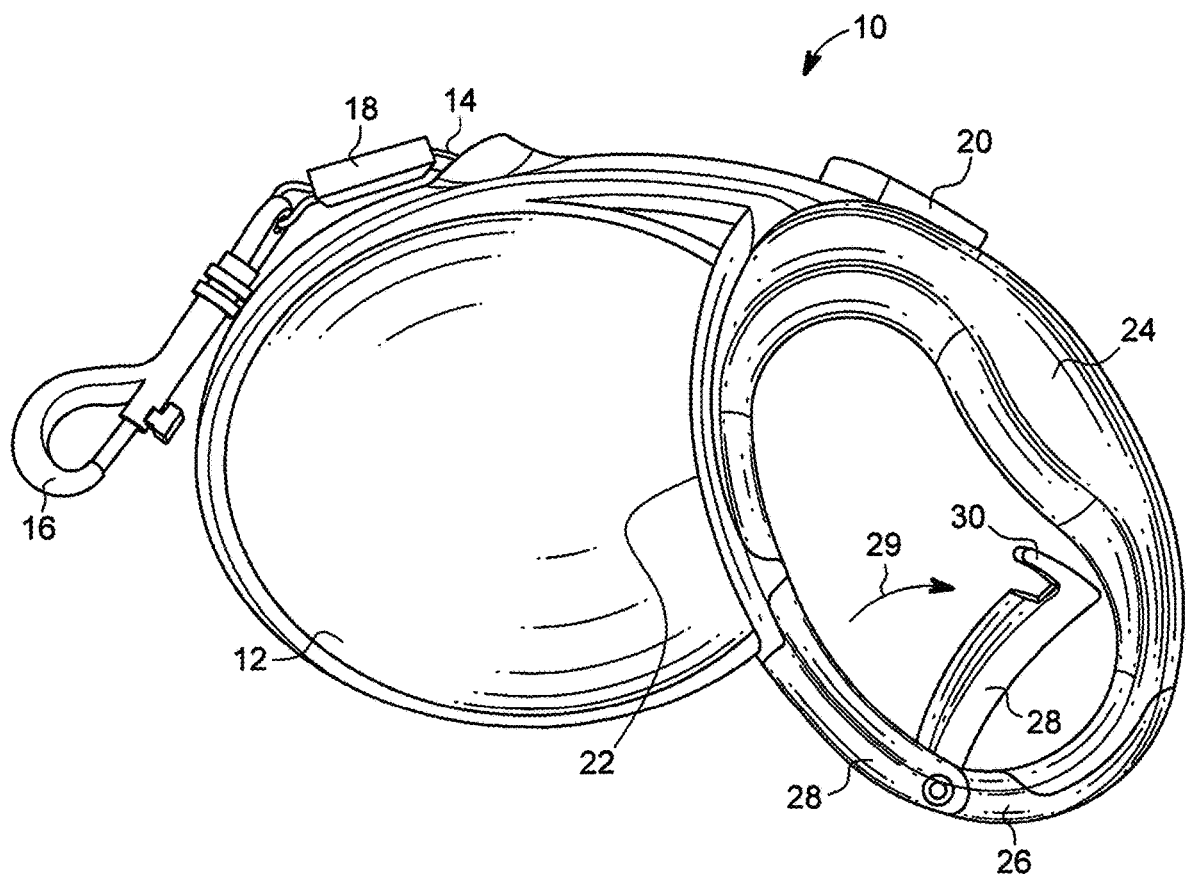
FIG. 1 is a front perspective view of the retractable dog leash device with a leash housing for holding a retractable leash coiled therein. One side of a soft grip handle, with a spring-loaded clip, is attached to a portion of the housing.

In FIG. 1, a front perspective view of the retractable dog leash device is shown having a general reference numeral 10. The device includes a leash housing 12 for holding a leash 14 coiled therein. The leash includes a dog collar attachment clip 16, a reflective tape 18 and a leash lock 20. The leash lock 20 is mounted on top of the leash housing 12 and attached to the leash 14. The leash lock 20 is used for holding the leash 14 at various lengths, when walking a dog.

Figure 1A:
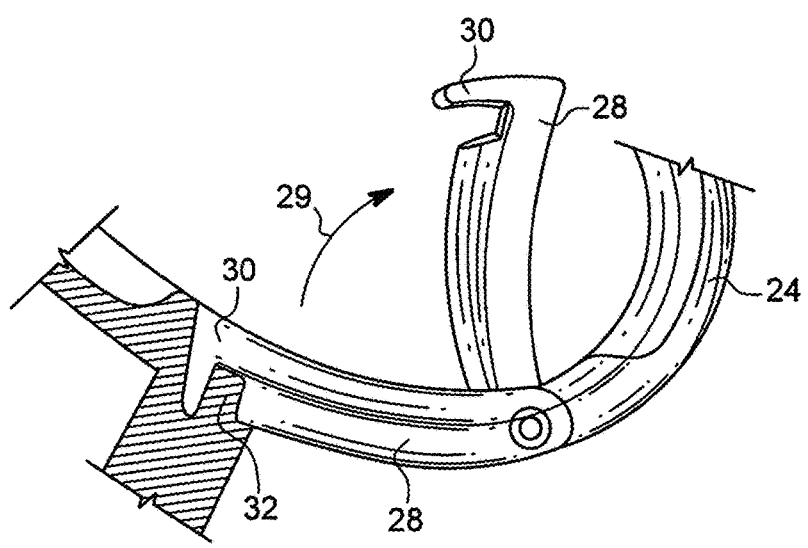
FIG. 1A is an enlarged sectional view of the spring-loaded clip received inside the lower portion of the handle.

The leash housing 12 is circular in design, with a concave portion 22 for receiving a portion of a soft grip handle 24, made of a flexible, silicon material for ease in gripping and holding the handle. The handle 24 is also circular in design. A lower portion 26 of the handle 24 includes a spring-loaded clip 28, shown in a closed position and an open position, as indicated by arrow 29. The clip 28 includes a "U" shaped clip end 30 for engaging a clip arm 32. The clip arm 32 is shown in FIG. 1A. One side of a soft grip handle 24, with the spring-loaded clip 28, is attached to a portion of the housing 12.

FIG. 1A is an enlarged sectional view of the clip end 30, received inside the lower portion 26 of the handle 24 and received around the clip arm 32 for holding the spring-loaded clip 28 in a closed position. Note, the clip 28 rotates in a clockwise manner, as indicated by arrow 29, for allowing the housing 12 and the handle 24 to be placed next to a chair arm or the like for added strength.

Figure 2:
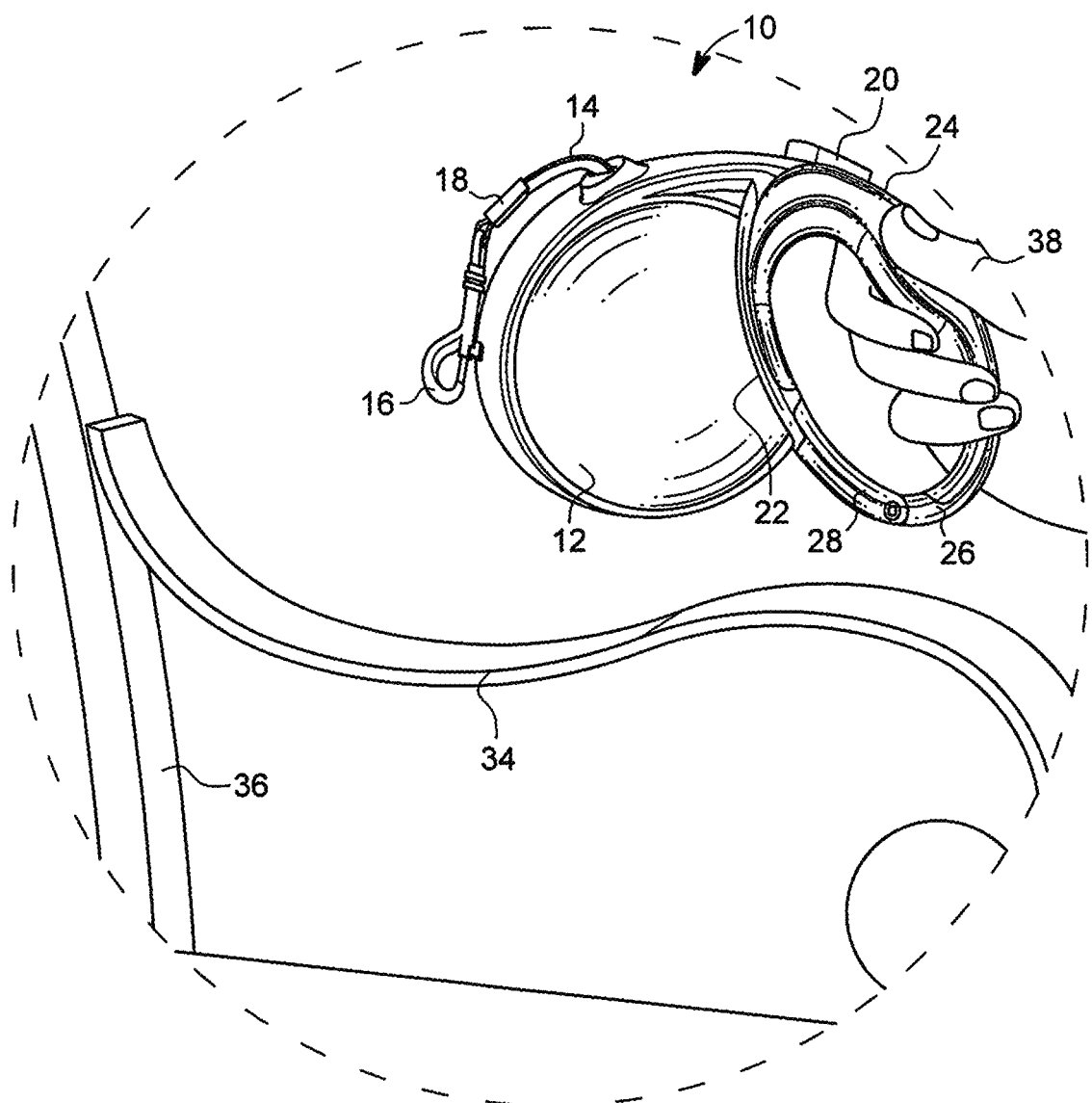
FIG. 2 is a perspective view of the dog leash device positioned for attachment to a chair arm.
Figure 5:
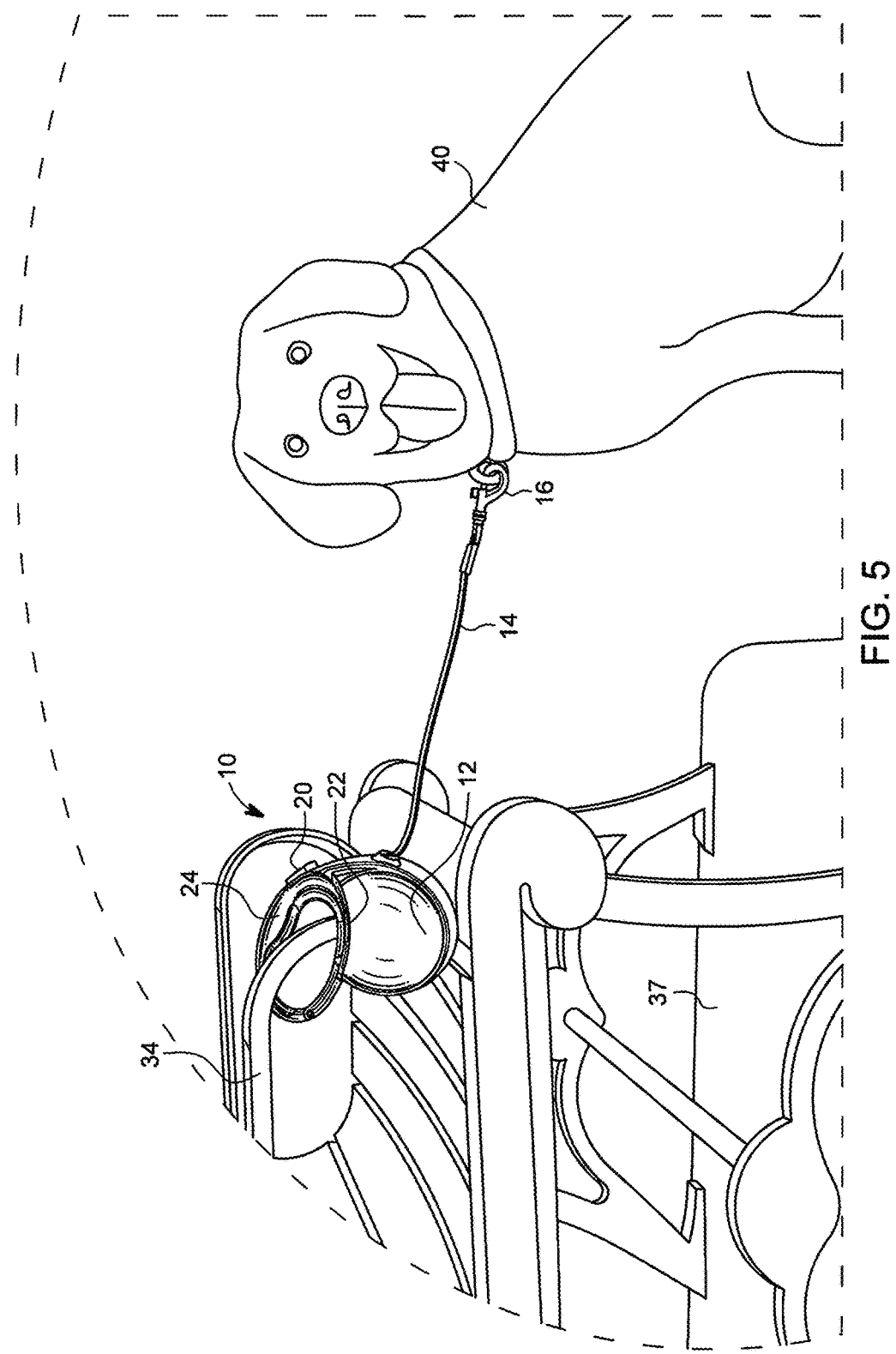
FIG. 5 is a perspective view of the leash housing and the handle pressed against the chair arm and holding the leash and dog in place.

In FIG. 2, a perspective view of the dog leash device 10 is shown positioned for attachment next to a side of a chair arm 34. The chair arm 34 is attached to a chair back 36, which is part of a chair 37. The chair 37 is shown in FIG. 5. When the spring loaded clip 28 is pressed against a side of the chair arm 34 using a human hand 38, the clip opens and the soft grip handle 24 is ready to be inserted around the chair arm 34.

Figure 3:
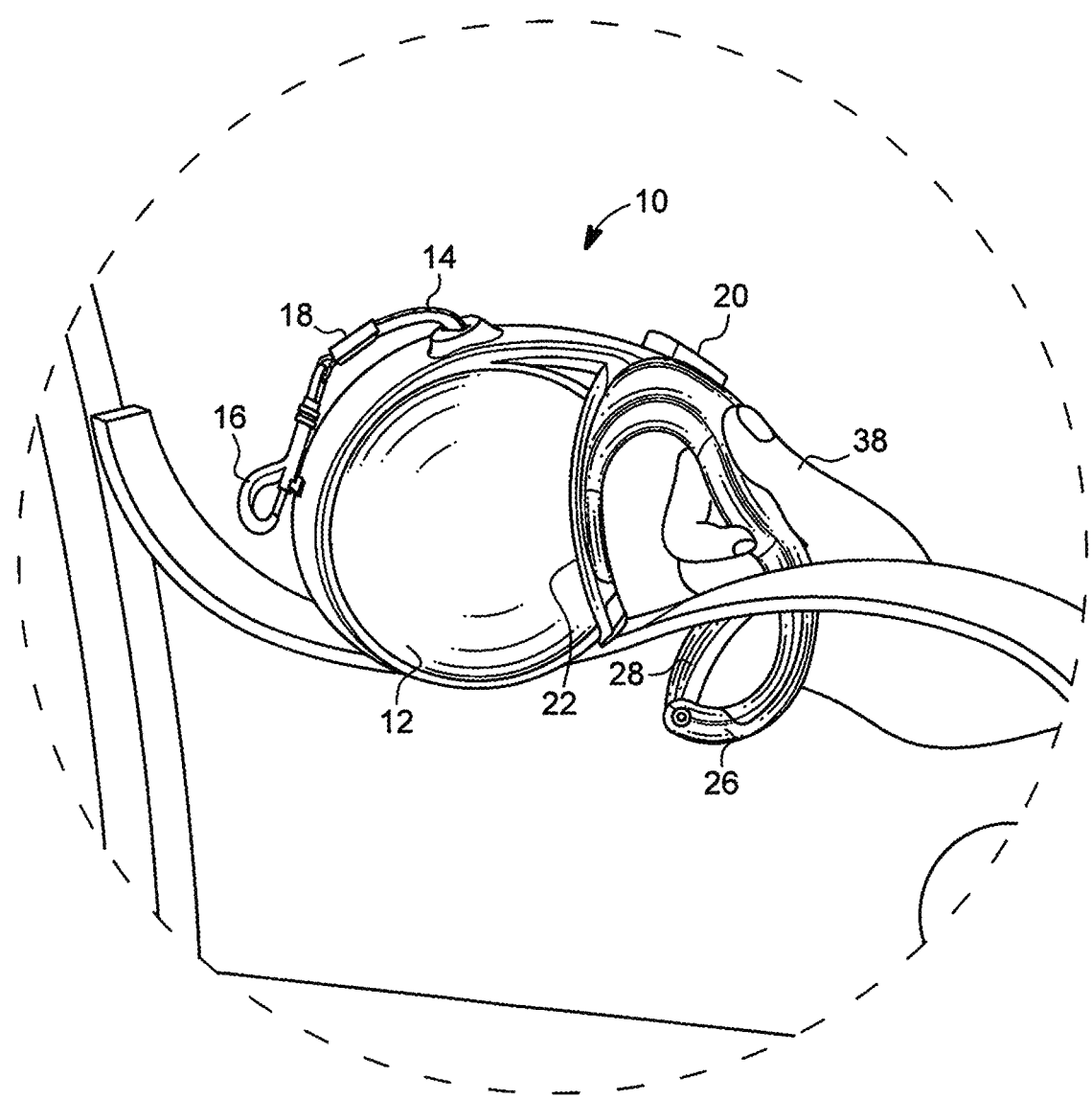
FIG. 3 is a perspective view of the dog leash device with the spring loaded clip opened and positioned for inserting the handle around the chair arm.

In FIG. 3, a perspective view of the dog leash device 10 is shown with the spring loaded clip 28 opened and positioned for inserting the handle 24 around the chair arm 34.

Figure 4:
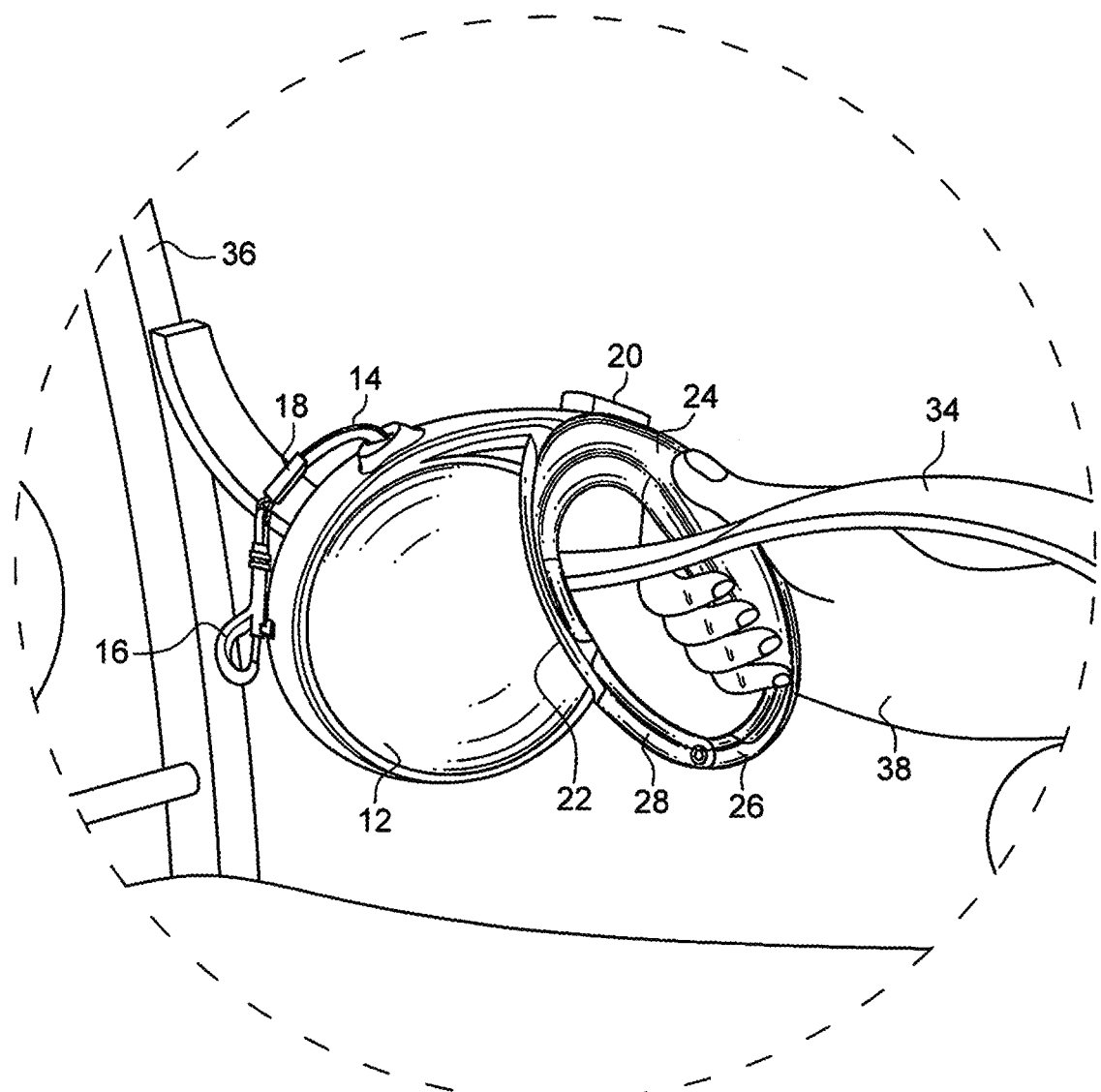
FIG. 4 is a perspective view of the dog leash device with the handle received around the chair arm.

In FIG. 4, a perspective view of the dog leash device 10 is illustrated with the handle 24 received around the chair arm 34 and for holding the leash housing 12 and the handle 24.

In FIG. 5, another perspective view of the dog leash 12 is shown, with the leash housing 12 and the soft grip handle 24 pressed against the chair arm 34. The leash 14 and a dog 40 are now held in place next to the chair 37.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A retractable dog leash device for walking a dog, the device comprising:
   a circular leash housing for holding a retractable dog leash therein and extending the leash outwardly and adapted for attaching to a dog collar, the housing having a concave portion therein;
   an approximately circular, soft grip handle attached to the concave portion of the leash housing, the handle made of a flexible material for ease in gripping and holding the handle;
   a spring-loaded clip mounted on the handle and held in a closed position and an open position on the handle, the spring-loaded clip rotates in a clockwise manner when moved from the closed position into the open position on the handle; whereby, when the spring-loaded clip is opened, the handle and the leash housing are adapted for receipt around a portion of a chair arm and holding the dog leash and the dog in place, the spring-loaded clip closed automatically after being opened, and
   a clip hinge, one end of the spring-loaded clip attached to the clip hinge, the clip hinge attached to a lower portion of a concave portion of the handle, a "U" shaped opposite end of the spring-loaded clip removably received around a clip arm, the clip arm formed in a lower portion of the concave portion of the leash housing; and
   wherein the clip arm comprises two notches;
   one of the two notches is an L-shaped notch flushed with an edge of the concave portion;
   whereby when the "U" shaped opposite end of the spring-loaded clip is attached to the clip arm in a closed position, this feature provides greater strength to the grip handle when the dog leash is placed in tension.

2. The device as described in claim 1 wherein the leash includes a dog collar attachment clip and a reflective tape attached thereto.

3. The device as described in claim 1 wherein the leash housing includes a leash lock, the leash lock attached to the leash, the leash lock is used for holding the leash at various lengths, when walking the dog.

4. A retractable dog leash device for walking a dog, the device comprising:
   a circular leash housing for holding a retractable dog leash therein and extending the leash outwardly and adapted for attaching to a dog collar, the housing having a concave portion therein;
   an approximately circular, soft grip handle made of silicon, the handle attached to the concave portion of the leash housing, the handle made of a flexible material for ease in gripping and holding the handle;
   a spring-loaded clip mounted on the handle and held in a closed position and an open position on the handle, the spring-loaded clip rotates in a clockwise manner when moved from the closed position into the open position on the handle; whereby, when the spring-loaded clip is opened, the handle and the leash housing are adapted for receipt around a portion of a chair arm and holding the dog leash and the dog in place, the spring-loaded clip closed automatically after being opened, and
   a clip hinge, one end of the spring-loaded clip attached to the clip hinge, the clip hinge attached to a lower portion of the concave portion of the handle, a "U" shaped opposite end of the spring-loaded clip removably received around a clip arm, the clip arm formed in a lower portion of a concave portion of the leash housing; and
   wherein the clip arm comprises two notches;
one of the two notches is an L-shaped notch flushed with an edge of the concave portion;
   whereby when the "U" shaped opposite end of the clip is attached to the clip arm in a closed position, this feature provides greater strength to the grip handle when the dog leash is placed in tension.

5. The device as described in claim 4 wherein the leash includes a dog collar attachment clip and a reflective tape attached thereto.

6. The device as described in claim 4 wherein the leash housing includes a leash lock, the leash lock attached to the leash, the leash lock is used for holding the leash at various lengths, when walking the dog.

* * * * *